United States Patent [19]

Schlising

[11] 4,144,842
[45] Mar. 20, 1979

[54] ACCESS LIMITING BIRD FEEDER

[76] Inventor: Anton E. Schlising, Rte. 1, Tomahawk, Wis. 54487

[21] Appl. No.: 834,048

[22] Filed: Sep. 16, 1977

Related U.S. Application Data

[63] Continuation of Ser. No. 700,055, Jun. 6, 1976, abandoned.

[51] Int. Cl.² .............................................. A01K 39/01
[52] U.S. Cl. .................................... 119/52 R; 119/63
[58] Field of Search ..................... 119/51 R, 52 R, 53, 119/77, 63

[56] References Cited

U.S. PATENT DOCUMENTS

| | | | |
|---|---|---|---|
| 1,114,482 | 10/1914 | Johnson | 119/52 R |
| 1,613,985 | 1/1927 | Dennis | 119/77 |
| 2,344,367 | 3/1944 | Pueschel | 119/52 R |
| 4,030,451 | 6/1977 | Miller | 119/51 R |

*Primary Examiner*—Hugh R. Chamblee
*Attorney, Agent, or Firm*—Russell J. Johnson

[57] ABSTRACT

This invention relates to a device whereby entry into the feed pan area of a bird feeder is limited to birds of a desired maximum size by means of adjusting the distance between a protective hood and the rim of a feed pan of the bird feeder. Access to the feed area is further limited by making the feed column of the feeder of such a height as to deny squirrels and other marauders a gripping purchase on the top of the feeder while they attempt to reach around the protective hood. In the preferred bird feeder a cylindrical feed column dispenses feed into a pan fixed relative to the bottom of the feed column. An adjustable height conical hood is positioned over the feed pan. Access to the feed in the feed pan is gained by birds passing between the rim of the feed pan and the hood. The maximum size of the bird which may gain access to the feed pan is determined by the distance set between the rim of the feed pan and the hood.

3 Claims, 4 Drawing Figures

U.S. Patent  Mar. 20, 1979  4,144,842
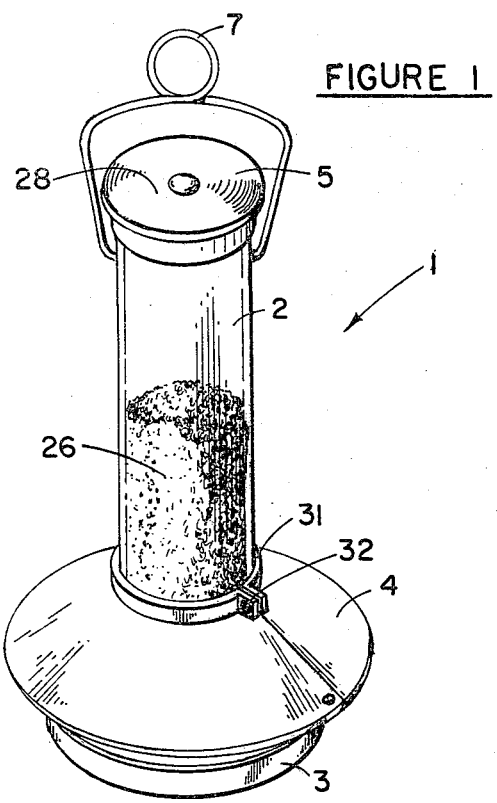
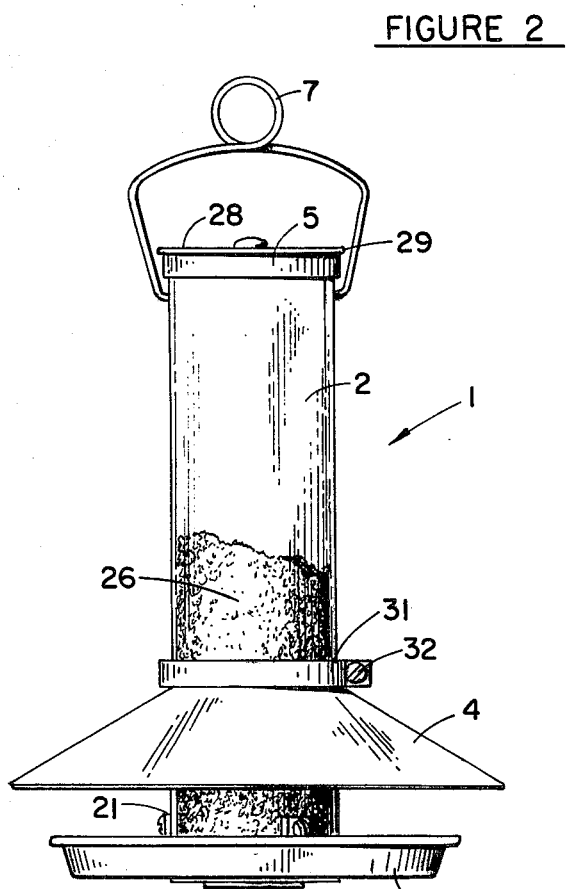
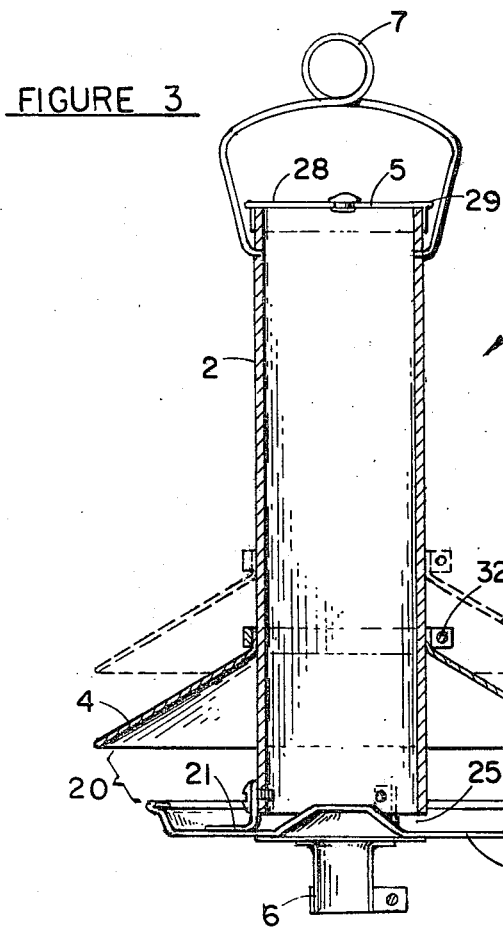
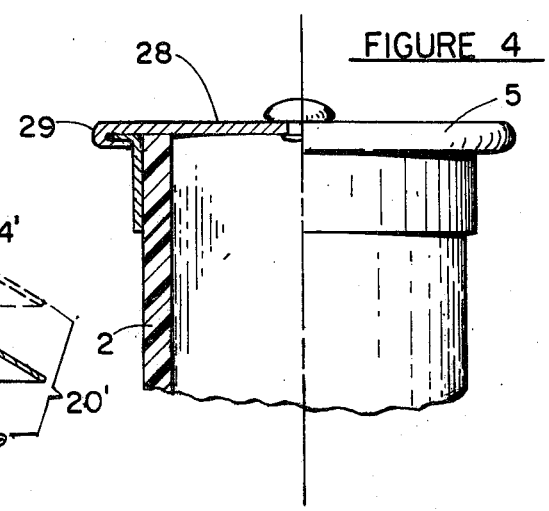

ACCESS LIMITING BIRD FEEDER

This is a continuation of application Ser. No. 700,055 filed June 25, 1976, now abandoned.

BACKGROUND OF THE INVENTION

In winter months many people put out feed for birds. Bird feeders of many different types and styles are used to provide feeding locations for birds. People who wish to feed birds are commonly confronted with several marauder related problems. First, there are non-bird marauders such as squirrels, mice and chipmunks. These animals are extremely ingenious in surmounting obstacles presented to discourage them from robbing the bird feeders. Second, are the bird marauders such as crows, blue jays and various black birds who, if permitted to do so, will empty the feeder almost as fast as it can be filled. A third frequently undesirable group of marauders are the bigger birds such as jays, cardinals and the like who will dominate the feeder and prevent the smaller birds from feeding.

Some people do not find the jays and cardinals to be undesirable and are willing to feed them along with the nuthatches and chickadees and other smaller birds. Other people would prefer to feed only the smaller birds. Still other people would prefer to feed only the smaller birds in the winter but desire to attract some species of larger early arriving birds in spring.

The device of this invention effectively denies access to the feeder to animal marauders and large bird marauders. The device of this invention also permits the user to establish the maximum size of the bird which may gain access to the feed dispensing area of the feeder by adjusting the height of the gap between the protective hood of the feeder and the feed pan. The device of this invention also permits the user to quickly and conveniently adjust the height of the hood using ordinary tools and requiring no special skills. The adjustable gap permits the user to quickly and conveniently open the access to the feed area to permit the cleaning of the feed area when it becomes desirable to do so. Other novel and utilitarian features of the device of this invention will be made apparent by the following specifications and the appended claims.

DESCRIPTION OF THE PRIOR ART

Most people who feed birds find pleasure in observing the birds while they are feeding. Many prior art marauder guards and/or size discriminating devices, while fulfilling their functions, greatly obscured the view of the feeding area and thereby diminished the pleasures of watching the birds feed. Size discriminating and access limiting devices such as that of J. H. Cather shown in U.S. Pat. No. 2,931,336 are of this type. The device of the instant invention has a feed pan hood configuration that permits a free and clear view of the feeding birds.

U.S. Pat. Nos. 3,372,676 to Williams and 3,717,126 to Falcone illustrate another means for restricting the size of the bird which may use the feeder. The patents are similar in that they provide an access way through which only the bird's head may enter. The size of the bird that may use the feeder is determined by the distance between a perch and the access way. The distance between the perch and the access way may be fixed as shown by Falcone or adjustable as taught by Williams.

The combination of a feeding pan which is open to view, a hood or roof to shelter the feed pan and a transparent feed container is found frequently in the prior art. U.S. Pat. No. 3,316,884 to Viggers and U.S. Pat. No. 2,891,508 to Bomer are patents which teach these features. While the above two patents do not teach the means of the instant invention they do serve to illustrate the desirability of the above recited relationship of parts and features.

SUMMARY OF THE INVENTION

The invention is a visitor size limiting device and marauder guard for a bird feeder. The size limiting function and a considerable amount of marauder protection is achieved by limiting the size of the entry way to the feeding area of the feed pan. The limiting is achieved by means of an adjustable size access way being created between a feed pan and a hood of the feeder. The feed pan or the hood or both may be provided with adjustment means whereby the space between the feed pan and the hood may be varied. In the preferred embodiment of the invention the feed pan is fixed relative to the feed column and the hood is positionably movable relative to the feed pan.

Additional marauder protection is provided by configuring the feed column to be longer than the convenient stretching length of squirrels and other such marauders. A distance of 10 inches or more between the top of the feed column and the feed pan has been found to be satisfactory. The length of the column thereby does not permit a squirrel to grip the cap of the feed column with his hind legs and hang down to the hood while he reaches around the hood to knock the feed to the ground where he can then descend and eat the feed. This form of marauder protection is further inhenced by forming the hood, feed column, and feed column cap in such a way and of materials such as metal and plastic so as not to afford marauders a gripping purchase on the hood, feed column or feeder column cap.

The feeder may be secured to the top of a post or hung by suitable means from above.

The preferred embodiment comprises a clear plastic cylindrical feed column. Fixed near the bottom of the column is a circular dished feed pan. The bottom of the feed column is supported above the center of the feed pan by suitable brackets to form the feed receiving area of the feed pan. The gap formed between the feed column and the feed pan serves to meter the feed into the pan as is conventional in the feeder art. A hood in the form of a truncated cone is movably mounted to the cylindrical feed column by means of a split ring clamp which is secured to the hood. Tightening and loosening of the ring clamp is achieved by tightening or loosening the screw arrangement which guides the two ends of the ring collar towards one another in a conventional manner.

The major diameter of the hood is slightly greater than that of the rim of the feed pan and the diameter of the feed pan is in the order of two to three times the diameter of the feed column.

As easily removed smooth topped cap with overhanging edges is provided as a top closure for the feed column.

A suitable hanging means is attached near the top of the feeder. A suitable pole mounting means is fixedly attached to the bottom of the feed pan.

BRIEF DESCRIPTION OF THE DRAWINGS

FIG. 1 is a pictorial view of a bird feeder showing the peferred embodiment of the device of this invention.

FIG. 2 is an elevational view of the bird feeder of FIG. 1.

FIG. 3 is a full section elevational view of the bird feeder of FIG. 1.

FIG. 4 is a partially sectioned view of the top of the bird feeder of FIG. 1.

DETAILED DESCRIPTION

In the drawings, like numbers refer to like objects.

Referring now to FIGS. 1 through 4. Bird feeder 1 comprises a transparent cylindrical feed column 2, a feed pan 3, a movable hood 4, a feed column cap 5, a post mounting means 6 and/or hanging means 7.

Feed pan 3 is secured to feed column 2 by means of brackets 21 as shown. Brackets 21 serve to maintain a gap 25 between the bottom of feed column 2 and feed pan 3. Feed 26 may enter feed pan 3 through gap 25. Post mounting means 6 is secured to the bottom of feed pan 3 as shown. Feed column cap 5 is provided as a closure for feed column 2. The smooth top 28 and overhanging edge 29 of feed column cap 5 serve to deny marauders a means for gripping feed column cap 5. Hanging means 7 is secured to feed column 2 as shown. Hanging means 7 is configured so as to permit the convenient removal of feed column cap 5 from feed column 2 in order that the feed supply in feed column 2 may be replenished.

Movable hood 4 is clampably secured to feed column 2 by means of split ring collar 31 which may be secured or freed by tightening or loosening threaded means 32 which may be a conventional screw or wing nut or the like.

A suitable access way 20 between the rim of feed pan 3 and movable hood 4 may be established by positioning movable hood 4 in the desired location and tightening threaded means 32. If a different access way 20' is desired threaded means 32 is loosened and movable hood 4 is moved to a new position 4' and threaded means 32 is again tightened to secure movable hood 4 in place.

Bird feeders are frequently placed in a location which, while being readily accessible to the birds, is frequently reached with some difficulty under adverse conditions by the caretaker. For that reason the invention provides a cap removal and replacement and a hood adjustment mechanics that are simple and convenient and can be achieved with a minimum of manipulation by a person of ordinary skills in a minimum of time while wearing gloves. Whether the feeder is hanging or mounted on a post, feed column cap 5 may be gripped under the overhanging lips and removed while wearing gloves. Feed column cap 5 may be placed in the feed pan or in a garment pocket while the feed column is being filled and feed column cap 5 may be replaced without any difficult manipulation.

While the preferred embodiment of the invention has been set forth in the specifications and the drawings it will be apparent to one skilled in the art to employ a variety of feed column shapes such as squares and other polygons in conjunction with the appropriate correspondingly shaped hoods and pans to achieve substantially the same end by using substantially the same means, and said means being employed in substantially the same way. To set forth all such obvious embodiments would lengthen the specifications and unduly multiply the drawings and claims. Therefore the invention should be understood to be limited only by the appended claims and all equivalents thereto which would be readily apparent to one skilled in the art.

What is claimed is:

1. A marauder protection providing access limiting small bird feeder comprising; in combination,
    (a) a first means and second means for enabling the supporting of the feeder several feet above the ground,
    (b) a cylindrical feed column of hard transparent material such as glass, acrylic plastic, and the like and having a top and a bottom,
    (c) a removable cap having a smooth top and the cap fitting closely to the top of the feed column in such a way as to deny a marauder a grip upon the cap or the top of the cylinder,
    (d) a circular feed pan positioned at and attached to the bottom of the feed column by means of brackets which maintain a gap between the feed column and the pan and the feed pan having a rim at its outer edge and a feed receiving area in the vicinity of the feed column and the diameter of the feed pan is greater than twice the diameter of the feed column,
    (e) a movable metal hood in the shape of a truncated cone positioned over the feed pan and the movable hood is clampably secured to the cylindrical feed column and the major diameter of the hood is greater than the diameter of the feed pan and the movable hood is positioned along the feed column with the major diameter down so as to overhang the rim of the feed pan to define a gap between the hood and the feed pan and thereby limit the maximum size of a bird which may pass between the hood and the feed pan and gain access to the feed in the vicinity of the feed column and the hood and the feed column combined provide a non-grippable expanse which is greater than the reaching length of most small animal marauders, and
    (f) the first means for enabling the supporting of the feeder is a wire bail hanging means secured to the top of the cylindrical feed column and the second means for enabling the supporting of the feeder is a post mounting means secured to the bottom of the feed pan.

2. The combination of claim 1 wherein the length of the feed column is greater than 10" and the diameter of the feed column is greater than 3".

3. The combination of claim 2 wherein the means for clampably securing the hood to the feed column is small in size and smooth in configuration and fits closely along the feed column so as to deny a marauder a gripping purchase on the hood and hood securing means.

* * * * *